United States Patent [19]
Harris et al.

[11] Patent Number: 5,373,637
[45] Date of Patent: Dec. 20, 1994

[54] PROCESS OF PRODUCING A BEARING HAVING INTERNAL LUBRICATION GROOVES

[75] Inventors: Bernard Harris, Northbrook; Dennis E. Bozych, Downers Grove, both of Ill.

[73] Assignee: Rexnord Corporation, Milwaukee, Wis.

[21] Appl. No.: 990,421

[22] Filed: Dec. 15, 1992

[51] Int. Cl.⁵ .............................................. B23P 15/00
[52] U.S. Cl. ............................ 29/898.12; 29/898.13; 29/458
[58] Field of Search ............ 29/898, 898.1, 898.12, 29/898.13, 426.1, 458, 527.1-527.6

[56] References Cited

U.S. PATENT DOCUMENTS

| | | | |
|---|---|---|---|
| 121,804 | 12/1971 | Murfey . | |
| 2,348,274 | 5/1944 | Aker | 308/240 |
| 2,389,253 | 11/1945 | Gatke | 308/238 |
| 3,616,000 | 10/1971 | Butzow et al. | 156/173 |
| 3,692,375 | 9/1972 | Matt et al. | 308/238 |
| 3,700,295 | 10/1972 | Butzow et al. | 308/72 |
| 3,974,009 | 8/1976 | Butzow et al. | 156/84 |
| 3,997,954 | 12/1976 | White | 29/149.5 B |
| 4,054,337 | 10/1977 | Matt et al. | 308/238 |
| 4,189,985 | 2/1980 | Harris | 92/153 |
| 4,282,764 | 8/1981 | Harris | 74/89.15 |
| 5,003,687 | 4/1991 | Lapp et al. | 29/600 |
| 5,042,153 | 8/1991 | Imao et al. | 29/898.12 |
| 5,114,521 | 5/1992 | Isegawa et al. | 29/898.12 |
| 5,265,334 | 11/1993 | Lucier | 29/898.13 |

Primary Examiner—Irene Cuda
Attorney, Agent, or Firm—Michael, Best & Friedrich

[57] ABSTRACT

A process for producing a plurality of bearing members each of which has a bore defined by an inner bearing surface of self-lubricating material containing lubrication grooves that open into the bore. To perform the process a mandrel is provided having an axial length, spaced apart ends and an outer surface, and one or more rod members is affixed on the outer surface. A parting agent is applied to the mandrel outer surface and rod members and a layer of self-lubricating material is layered over the outer surface and rod members. A filament wound overlayment is applied on top of the layer of self-lubricating material along with a hardenable resin to bond the layer of self-lubricating material and overlayment together. The resin is hardened to form a rigid elongated tube member and the mandrel and rods are removed to expose the inner bearing surface and lubrication grooves. The rigid tube is then severed transversely into a plurality of individual bearing members.

23 Claims, 3 Drawing Sheets

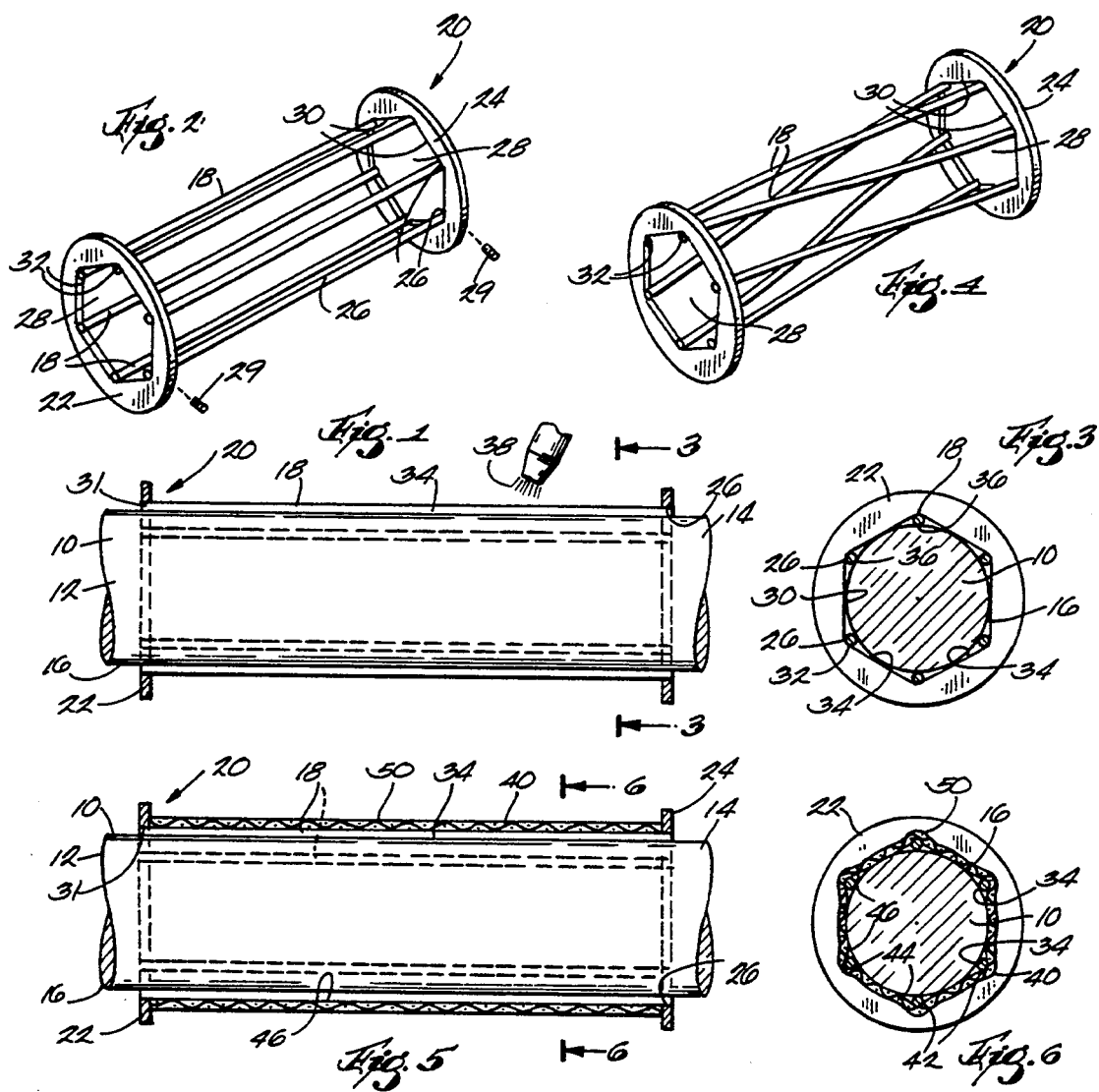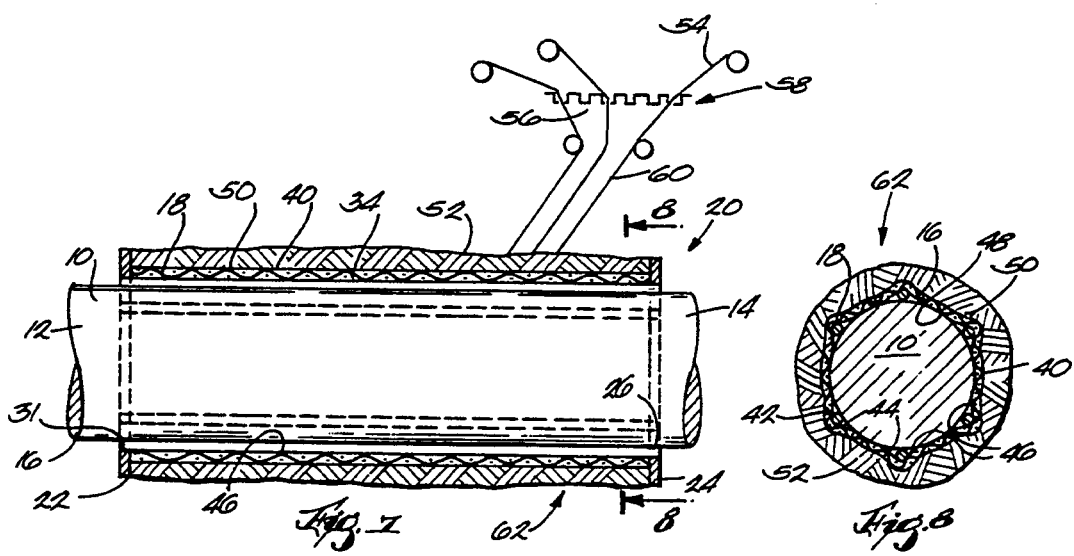

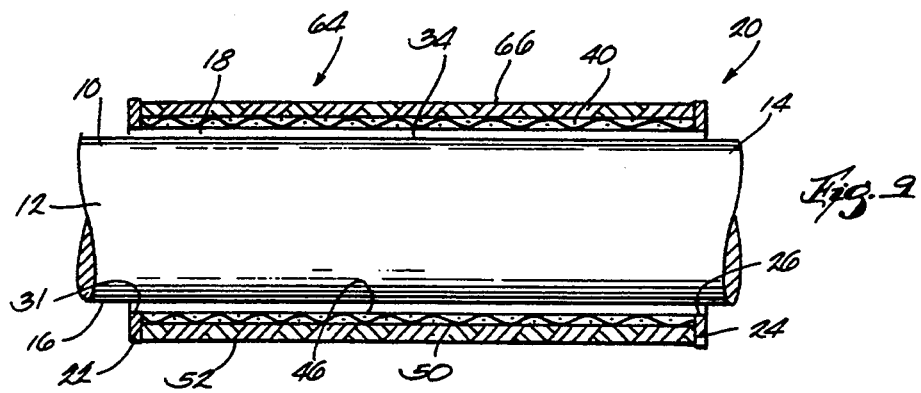
Fig. 9
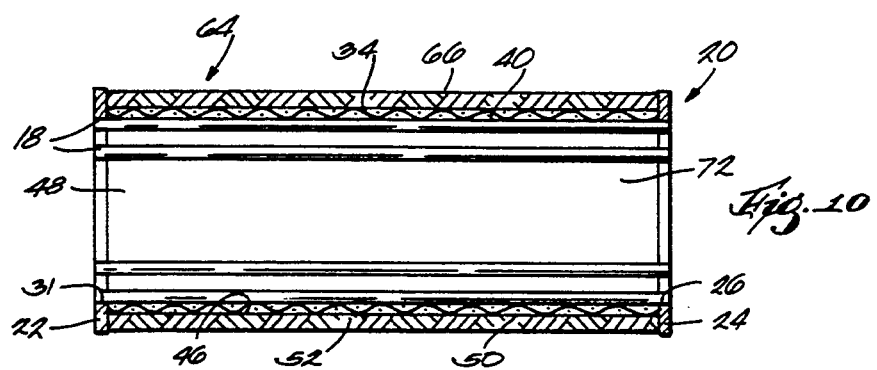
Fig. 10
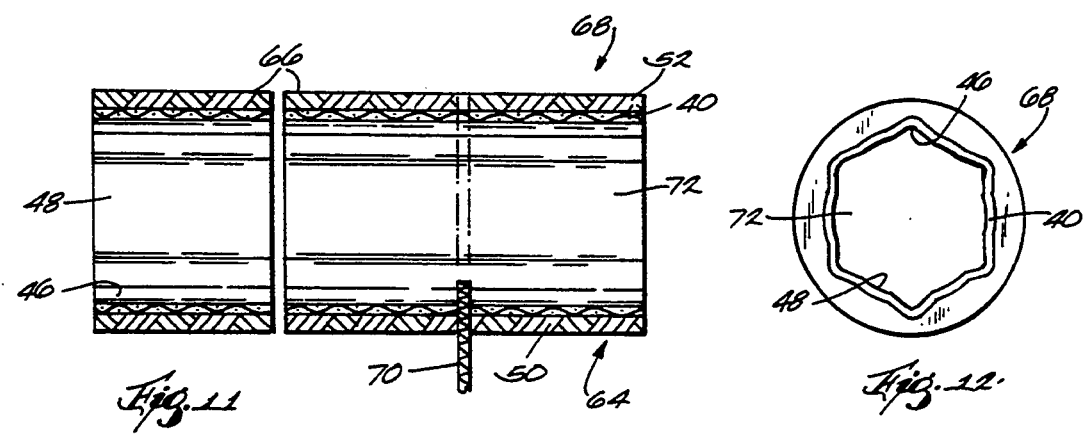
Fig. 11
Fig. 12
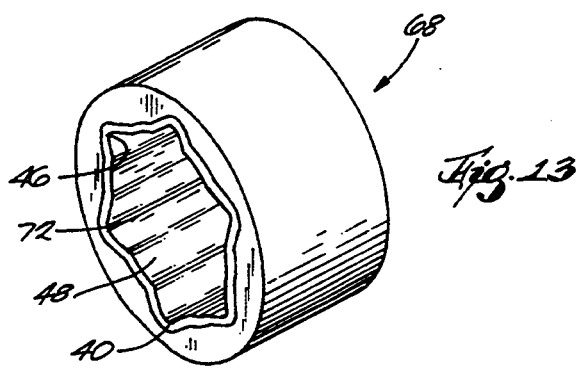
Fig. 13

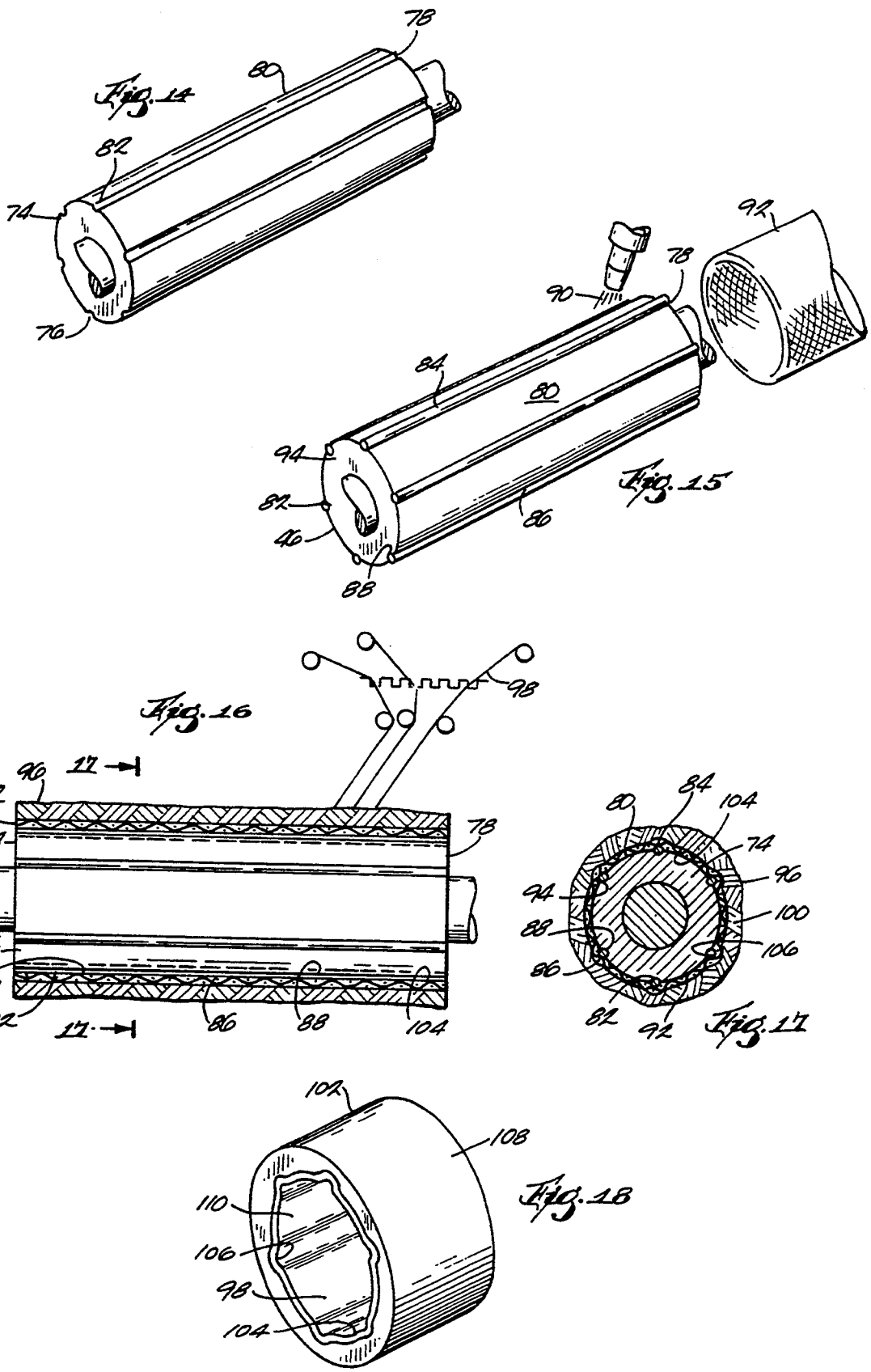

PROCESS OF PRODUCING A BEARING HAVING INTERNAL LUBRICATION GROOVES

BACKGROUND OF THE INVENTION

This invention relates to a process for producing a bearing having internal lubrication grooves and to the bearing produced thereby.

In many bearing applications, it is desirable to provide grooves in either the outer surface of the inner bearing element or the inner surface of the outer bearing element in order to allow access to the bearing surface by lubricating materials such as oil. It is known to produce such lubrication grooves by molding or machining grooves into an existing surface of the inner or outer bearing elements.

U.S. Pat. No. 2,389,253, issued to T. L. Gatke, on Feb. 12, 1944, discloses a bearing element for use as a shaft bearing wherein the inner surface of the outer bearing element is molded under heat and pressure to include axially extending lubrication grooves. The bearing is manufactured in two parts or halves which are assembled together during installation. U.S. Pat. No. 2,348,274, issued to E. S. Aker, on Jul. 28, 1943, discloses lubrication grooves formed from a corrugated sleeve having longitudinally extending channels. This bearing is manufactured of a non-metallic moldable material formed over the carrier sleeve of a corrugated rigid material such as a metal.

In U.S. Pat. No. 4,189,985, issued to Bernard Harris, on Feb. 26, 1980, a cylinder is disclosed having a bearing surface, internal surface including spiral lubrication grooves which are formed during manufacture of the cylinder due to the nature of a seamless fabric used as a bearing liner. The formation of grooves in this bearing is dependent upon formation of small voids under certain conditions and using a certain weave of fabric which merge and form minute continuous spiral grooves for retaining a slight amount of lubricant.

A problem with existing processes for putting longitudinally extending lubrication grooves into a bearing is that they involve either machining or heat forming of the bearing parts. Where the bearing includes a filament wound structure, as for example, an outer bearing race formed of wound fiberglass filaments impregnated with resin, such processes are not well suited. For example, when a bearing outer race is sought having a self-lubricating liner such as a TEFLON fabric that forms the bearing surface the known processes are not practical. Machining will remove part of the TEFLON fabric leaving frayed edges along the grooves and fiberglass cannot be shaped by heat forming to provide lubrication grooves. In summary, known processes are complicated and costly, requiring machining of grooves into the inner surface of a bearing element, and when a filament wound structure is required special expensively configured forming mandrels are needed.

Therefore, in spite of extensive development in this field over many years, a simple reliable and reproducible process for producing filament wound bearing members having lubrication grooves on the inner surface of the outer bearing member is needed. More specifically, a process is needed that will avoid the necessity of elaborate and permanent configurations of special mandrels on which the filament wound outer race is formed and which will not require grinding or other post curing processing of the filament wound structure.

SUMMARY OF THE INVENTION

The basic object of this invention is to provide a process for producing a bearing having internal lubrication grooves which is simple and low in cost.

Another object of the invention is to provide a process which permits the functional characteristics of the internal lubrication grooves to be varied in a simple low cost manner.

A still further object of the invention is to provide a bearing having lubrication grooves that are lined with a self-lubricating bearing surface.

The achievement of these and other objects is provided by a process comprising the steps of providing a mandrel having an axial length, spaced apart ends and an outer surface. One or more rod members are then affixed on the outer surface of the mandrel to extend generally lengthwise between the ends of the mandrel. A plurality of rod members is preferred.

A jig means that is releasably securable adjacent each of the mandrel ends may be utilized for holding the rod member or members on the mandrel surface, while, alternatively, grooves may be provided in the mandrel surface and rod members laid within the grooves. The grooves may be helically arranged on the mandrel surface, and if a releasable jig means is utilized, the jig means at one end may be secured to hold the rod members generally parallel to the axis while leaving the jig means that is adjacent the other end unsecured to be rotated angularly a desired degree relative to the mandrel axis to orientate the rod members helically, after which the rotated jig means is secured in its angular position to hold the rod members in the helical orientation to provide rifled lubrication grooves.

A parting agent is applied to the mandrel outer surface and rod members and a layer of self-lubricating material is applied over the outer surface and rod members. The layer of self-lubricating material preferably comprises shrinkable materials and is formed into a sleeve that is passed over the mandrel outer surface and the rod members thereon and then shrunk to cause the layer to form stretched portions that bridge from each of the rod members to adjacent areas of the outer surface of the mandrel to create voids along each of the rod members so that the lubrication groove remaining after each rod member it removed will have a generally triangular cross-section to increase the circumferential area thereof.

An overlayment is then built on top of the layer of self-lubricating material to cause it to conform to the mandrel outer surface and rod members. The overlayment preferably comprises filaments helically wound under tension over the layer of self-lubricating material to be in contact with the stretched portions of self-lubricating material that lay in bridging relation between the rod members and mandrel. A hardenable liquid, such as a resin, is applied with the overlayment to bond the layer and overlayment together. The resin can be applied simultaneously with the filaments, and the resin is selected to have a viscosity sufficiently high to prevent resin from bleeding through to the voids and filling the lubrication grooves with unhardened resin.

The resin is then hardened to form the overlayment into a rigid elongated tube member having a peripheral surface and a length that will permit it to be severed into a plurality of individual bearing members, after which the mandrel is removed from the rigid tube member to expose the inner bearing surface. The rod members are then removed to expose the lubrication grooves. The rigid tube is finally severed transversely into a plurality of individual bearing members. The peripheral surface of the rigid bearing member may be finished to any desired dimension or contour preferably prior to the severing.

The bearing member produced by this process has a bore defined by an inner bearing surface of self-lubricating material containing lubrication grooves also of self-lubricating material opening into the bore.

Other features or advantages of the invention will become apparent to those of ordinary skill in the art upon review of the following detailed description, claims and drawings.

BRIEF DESCRIPTION OF THE DRAWINGS

FIG. 1 is a side elevational view, partially in section, of a winding mandrel having a plurality of rod members mounted thereon.

FIG. 2 is a perspective view of a jig assembly for securing rod members on the mandrel surface.

FIG. 3 is a cross sectional view taken along line 3—3 in FIG. 1, showing the relationship of the ring member and the mandrel surface in securing the rod members.

FIG. 4 is a perspective view of the jig assembly of FIG. 2 given a helical twist.

FIG. 5 is a side elevational view of the winding mandrel of FIG. 1 showing the fabric applied over the rod members and the jig assembly in section.

FIG. 6 is a cross sectional view taken along line 6—6 in FIG. 5, showing the relationship of rod members and fabric to the mandrel surface.

FIG. 7 is a side elevational view of the winding mandrel of FIG. 5 showing, in section, an overlayment of resin-impregnated filaments applied over the fabric.

FIG. 8 is a cross sectional view taken along lines 8—8 of FIG. 7 showing the relationship of the overlayment, fabric, rod members and mandrel.

FIG. 9 is a side elevational view of the winding mandrel of FIG. 6 showing a cured rigid elongated tube member in section finished to a desired external dimension.

FIG. 10 is a side elevational view showing the tube member of FIG. 9 wherein the mandrel has been removed to expose the internal bearing surface.

FIG. 11 is a side elevational view of the tube member of FIG. 10 wherein the rod members have been removed and showing severing into individual bearing members.

FIG. 12 is an axial end view of a bearing member severed from the tube member of FIG. 11.

FIG. 13 is a perspective view of the bearing member of FIG. 12.

FIG. 14 is a perspective view of an alternative winding mandrel having axial grooves in the mandrel surface.

FIG. 15 is a perspective view of the winding mandrel of FIG. 14 having a plurality of rod members mounted in the grooves and a fabric sleeve positioned to be applied over the rod members.

FIG. 16 is a side elevational view of the winding mandrel of FIG. 15 showing, in section, an overlayment of resin-impregnated filaments applied over the fabric.

FIG. 17 is a cross section taken along line 17—17 of FIG. 16 showing the relationship of the overlayment, fabric, rod members and mandrel.

FIG. 18 is a perspective view of a bearing member produced from the alternative mandrel as depicted in FIG. 14.

DESCRIPTION OF THE PREFERRED EMBODIMENT

Referring to the drawings, the process first comprises providing a mandrel 10 having an axial length, spaced apart ends 12 and 14 and an outer surface 16 (FIG. 1). The process may be used for producing a plurality of individual bearing members 68, shown in FIG. 13, and the axial length of the mandrel 10 may be selected accordingly.

One or more rod members 18 are placed on the mandrel surface 16 to extend generally lengthwise between the ends 12 and 14 of the mandrel 10. The drawings demonstrate a preferred embodiment utilizing six such rod members 18. A greater or lesser number of rod members 18 may be used. For affixing the rod members 18 against the mandrel 10, a jig means 20 (FIG. 2) is provided that is releasably securable adjacent each of the mandrel ends 12 and 14 for holding the rod members 18 in place on and in contact with the mandrel surface 16.

As seen in FIG. 2, the jig means 20 may comprise, a pair of preferably hexagonal ring members 22 and 24, each having rod holding means 26 for holding the rod members 18 in fixed positions on the mandrel surface 16. The ring members 22 and 24 are identical, each having bores 28 and flattened internal surfaces 30. The width between opposite flattened internal surfaces 30 matches the diameter across the mandrel surface 16. The ring members 22 and 24 also have internal corners 32 where flattened surfaces 30 meet each other. A ring member 22 or 24 on a cylindrical mandrel 10, FIG. 3, will touch the mandrel surface 16 along six lines 34, with rod members 18 each contacting the mandrel surface 16 along a single line 36. The corners of ring members 22 or 24 provide the rod holding means 26, with the rod members occupying the triangular space formed at each corner 32 and between two flattened surfaces 30 and the mandrel surface 16.

A releasable clamping means, such as set screws 29 or hose clamps, not shown, can be provided for securing the ring members 22 and 24 on the mandrel surface 16. A suitable hose clamp arrangement might comprise removing a small radial segment, not shown, from each ring member 22,24, to allow tightening of the ring members onto the mandrel surface 16.

The rod members 18 can optionally be given a helical orientation (FIG. 4), such as by securing ring member 22 adjacent mandrel end 12 to hold the rod members 16 generally parallel to the axis while leaving the ring member 24 adjacent the other end unsecured. Rotating the unsecured ring member 24 angularly a desired degree relative to the mandrel axis will orient the rod members 18 helically. The rotated ring member 24 would then be secured in its angular position to hold the rod members 18 in the helical orientation.

Once the rod members 18 are in the desired position on the mandrel surface 16, the mandrel surface 16 and rod members 18 are coated with a suitable parting agent 38 (FIG. 1). Many suitable silicone materials are known for this purpose. In the preferred process two layers of parting agent 38 are pre-applied to the rod members 18 prior to assembly on the mandrel 10, with a final coating applied to the assembled rod members 18 and the mandrel surface 16 after assembly. The rod members 18 may be submersed in parting agent 38 and subsequently baked to pre-apply the parting agent 38.

A layer of self-lubricating material, such as a woven fabric 40 comprising TEFLON filaments, is next applied over the mandrel surface 16 and rod members 18 (FIG. 5). The fabric 40 preferably comprises a weave of self-lubricating and shrinkable materials. A preferred fabric 40 is described in U.S. Pat. No. 3,804,479, the teachings of which are incorporated herein by reference, and comprises lengthwise yarns predominantly of TEFLON and circumferential yarns of a material, such as DACRON yarn, which shrinks when heated to 300° F. For ease of application, the fabric 40 is preferably formed into a sleeve, such as sleeve 92 (FIG. 15), that is passed over the mandrel surface 16 and the rod members 18 thereon.

The fabric 40 is then conformed to the mandrel surface 16 and rod members 18 (FIG. 6) by heating to shrink the shrinkable material. An alternative means for conforming the fabric 40 to the mandrel surface 16 comprises applying the fabric 40 loosely over the mandrel surface 16 and stretching the fabric 40 axially, which concomitantly diminishes the circumference of the fabric 40 and thereby tightens the fabric 40 over the mandrel surface 16. In some cases stretching alone will conform the fabric 40 to the mandrel surface 16 to sufficient degree.

As seen in FIG. 6, the conformed fabric 40 forms stretched portions 42 that bridge from each of the rod members 18 to adjacent areas of the mandrel surface 16. The inner surface 44 of the stretched fabric 40 stretched over each of the rods 18 forms grooves 46 when the rods 18 are removed. Voids 44 are created along each side of the rods 18 each having a generally triangular cross-section. It is to be noted that the greater extent of bridging of the stretched fabric 42 outward on the mandrel surface 16 away from the rod members 18, the greater the circumferential area of the voids 44, and the wider the grooves 46 to thereby permit control of the area and extent of the lubrication groves as well as the area of the bearing surface 48. The fabric 40 also forms a series of cylindrical low friction bearing surfaces 48 having intimate contact and conformation with portions of the mandrel surface 16 between the rod members 18. The fabric bearing surfaces 48 will be the load supporting surface in the completed bearing. The fabric 40, when initially installed, will also have an ,outer exposed bonding surface 50.

An overlayment 52 is applied over the bonding surfaces 50 of fabric 40 as shown in FIG. 7. The overlayment is preferably produced of filaments 54 wound while rotating the mandrel 10. The winding tension will aid in conforming the fabric 40 to the mandrel surface 16 and rod members 18. The overlayment 52 will cover and contact the entire bonding surface 50 of the fabric 40. A resin 56 is applied with the filaments 54.

A preferred process for applying the filaments 54 is through a filament winding process much as that described in U.S. Pat. No. 3,974,009, the teachings of which are incorporated herein by reference. In this process the mandrel 10 is secured in a winding machine, not shown, and the winding of the filaments 54 is accomplished simultaneously with the application of the resin 56, by passing the filaments 54 through a bath 58 of liquid resin 56 prior to winding. In FIG. 7 the resin bath 58 is a cone-shaped receptacle. Preferably a plurality of filaments 54 pass downwardly through the bath 58 and are oriented parallel to each other to form a tape 60 of resin-impregnated filaments 54. The bath 58 is supported on a reciprocating carriage, not shown, and by repeated passes of the tape 60 over a rotating mandrel 10 a plurality of filament layers are applied to form the filament wound overlayment 52. The direction of the winding changes when the tape 60 nears the ends of the mandrel 10, and the filaments 54 are thus helically wound in overlapping layers. The pressure applied by the filaments 54 assists in forcing the resin 56 into the fabric 40 to better impregnate and penetrate the resin 56 into the fibers of the fabric 40. Preferably, the resin 56 will be of a high enough viscosity so that it will not bleed entirely through the fabric 40, fill the voids 44 formed by the fabric 40 bridging over the rod members 18 on the mandrel surface 16. However, it would be possible to fill the voids 44 and reduce the lubricating capacity of the grooves.

The bonding surface 50 of the fabric 40 may be pre-coated with resin 56. A thixotropic resin 56 can be made for this purpose by filling a lower viscosity resin with CAB-O-SIL (Trademark for fire dried formed silica $S_iO_2$ having a surface area between 200 and 400 $m^2/gm$). A liquid filled by such a compound is rendered thixotropic, i.e., is gel-like becoming fluid when disturbed. A thixotropic or high-viscosity resin 56 will not penetrate the fabric 40 and fill the voids 44 with liquid resin 56. If a high viscosity or thixotropic resin 56 is pre-applied to the fabric 40, a lower viscosity resin may be applied with the filaments 54 for filling the interstices between filaments and for binding the filaments into a rigid overlayment 52. If a thickened or thixotropic resin 56 is applied with the filaments 54, very little bleed through into the voids 44 occurs in any case, and the pre-coating of high viscosity or thixotropic resin 56 may be omitted.

When the winding of the overlayment 52 is completed, the tape 60 is cut and secured, providing an unhardened elongated cylindrical member 62 of resin-impregnated circumferential filaments 54 and resin-coated fabric 40. The member 62 is then hardened. Preferably, the mandrel 10 is removed from the winding machine, and handled at its ends until curing, or hardening, of the unhardened elongated cylindrical member 62 can be effected. Curing can be at elevated or ambient temperatures, and by any known method, such as by heating in an oven, not shown. The resin 56 can also be heated directly, such as by infra red or high frequency radio radiation. Curing the cylindrical member 62 integrally bonds the fabric 40 and overlayment 52 together into a rigid elongated tube member 64 (FIG. 8). The mandrel 10 is preferably kept within the tube member 64 to provide an arbor for subsequent finishing operations.

The tube member 64 can be trimmed to have a desired overall axial length. The tube member 64 is then finished in a conventional manner to have a peripheral surface 66 of desired dimensions and contour (FIG. 9).

The mandrel 10 is then withdrawn axially from the tube member 64 to expose the inner bearing surfaces 48 of the fabric 40 (FIG. 10) and the rods 18. The rod members 18 are then removed from the voids 44 to expose the grooves 46 in the fabric 40 (FIG. 11). If the plurality of rod members 18 have been previously arranged to extend helically on the mandrel surface 16, a finished tube member 64 is provided having rifled grooves, not shown.

The tube member 64 is then severed transversely into a plurality of individual bearing members 68, such as by application of a cutting tool 70 (FIG. 11).

FIGS. 12 and 13 show a finished individual bearing member 68. Each such bearing member 68 has a bore 72 defined by inner bearing surfaces 48, comprising self-lubricating fabric 40 integrally bonded to a hardened overlayment 52, alternating with lubrication grooves 46 opening into the bore 72, and likewise comprising self-lubricating fabric 40.

In an alternative embodiment depicted in FIGS. 14 through 18, the process provides a mandrel 74 having an axial length, spaced apart ends 76 and 78 and an outer surface 80 having at least one axially extending mandrel groove 82. In the preferred embodiment of FIG. 14 a plurality of mandrel grooves 82 is used. The mandrel grooves 82 can optionally be provided in a helical or even crossing orientation, not shown, to provide rifled lubrication grooves in the rigid tube member.

Referring to FIG. 15, rod members 84 are placed on the outer surface 80 to extend generally lengthwise between the ends 76 and 78 of the mandrel 74 and lie within the axially mandrel grooves 82, with an exposed portion 86 of the rod members 84 extending radially above the mandrel surface 80 and a lower unexposed portion 88 hidden in the mandrel grooves 82. Deeper mandrel grooves 82 will mean that the extent of the rod member exposed portions 86 above the surface will be reduced, while conversely, shallower mandrel grooves 82 will mean that the extent of rod member exposed portions 86 above the surface will be increased.

The rod members 84 and mandrel surface 80 are coated with a suitable parting agent 90, and a layer of self-lubricating fabric 92 of woven TEFLON material is applied, as shown in FIG. 16, over the mandrel surface 80 and rod members 84, and then conformed by shrinking the fabric 92, in the manner described for the first embodiment. The shrunken fabric 92, holds the rod member 84 in the mandrel grooves 82. Voids 94 (FIG. 17) are formed beneath the fabric 92 adjacent the rod members 84, by bridging of the fabric 92 over the mandrel surface 80 to the exposed portions 86 of the rod members 84.

An overlayment 96 of resin-impregnated fiberglass filaments 98 is then applied over the layer of self-lubricating fabric 92, by the same filament winding process described for FIG. 7. The overlayment 96 is cured to form a rigid tube member 100, by any suitable curing process. The tube member 100 is then finished to provide an external surface 102 of desired dimension (FIG. 18). The tube members 100 have inner bearing surfaces 104 of fabric 92 adjacent the mandrel surfaces 80 between mandrel grooves 82. The fabric inner surface 92 also forms lubrication grooves 106 over the rod members 84. After removal of the mandrel 74 and rod members 84, the lubrication grooves 106 and bearing surfaces 104 are exposed, after which individual bearing members 108, FIG. 18, can be severed, as shown in FIG. 11, from the tube member in a conventional fashion. Each finished bearing member 108 has a bore 110 defined by the inner bearing surfaces 104 and the lubrication grooves 106 opening into the bore 110.

The alternative bearing members 108 have smaller lubrication grooves 106 for a given size of the rod members 84 than do the bearing members 68 of the first embodiment shown in FIGS. 12 and 13. This is because the rod members 84 are recessed within the mandrel grooves 82 and only a portion of each rod member 84 extends radially beyond the bearing surface 80. The deeper the mandrel grooves 82 of the mandrel 74, the greater the proportion 88 of the rod members 84 that will be hidden within the mandrel grooves 82, and consequently the lower the bridging of fabric 92 and the smaller the voids 94.

Generally, then, the larger the rod members 84 that are chosen, the larger the lubrication grooves 106 and the smaller the bearing surfaces 104. By laying rod members in recessed mandrel grooves 82, however, the rod member elevation above the mandrel surface 80 is reduced for a given size of rod member 84, which will reduce the size of the lubrication grooves 106 and increase the bearing surface area 104. By carefully choosing the size of the rod member 84 and the depth of the mandrel grooves 82, the relative size and shape of the lubrication grooves 106 can be controlled, and different configurations will be desirable for different applications, depending to a great extent upon the environment where the bearing member 108 will be used and the characteristics of the lubricant to be used in that environment.

From the foregoing description, one skilled in the art can make various changes and modifications to adapt the invention to various usages and conditions without departing from the spirit and scope of the invention.

We claim:

1. A process for producing a plurality of bearing members each of which has a bore defined by an inner bearing surface of self-lubricating material containing lubrication grooves that open into said bore comprising the steps of:
   A. providing a mandrel having an axial length, spaced apart ends and an outer surface;
   B. affixing one or more rod member(s) on said outer surface to extend generally lengthwise between said ends of the mandrel;
   C. applying a parting agent to said mandrel outer surface and rod member(s);
   D. applying a layer of self-lubricating material over said outer surface and rod members;
   E. applying an overlayment on top of said layer of self-lubricating material to cause it to conform to said mandrel outer surface and rod member(s);
   F. applying a hardenable liquid to bond said layer and overlayment together;
   G. hardening said liquid to form a rigid elongated tube member having a peripheral surface and a length that will permit it to be severed into a plurality of individual bearing members;
   H. removing said mandrel from said rigid tube member to expose said inner bearing surface and removing said rod member(s) to expose said lubrication groove(s); and
   I. severing said rigid tube member transversely into a plurality of individual bearing members.

2. The process according to claim 1 comprising the additional steps of:
   providing a jig means that is releasably securable adjacent each of said mandrel ends for holding said rod member(s); and
   in step B, placing said rod member(s) in said jig means and securing said jig means adjacent each of said mandrel ends to hold said rod member(s) in contact with said outer surface for said mandrel.

3. The process according to claim 2 wherein step B includes the additional steps of releasably securing said jig means that is adjacent one of said mandrel ends to hold said rod member(s) generally parallel to said axis while leaving said jig means that is adjacent the other of said mandrel ends unsecured; and rotating said unsecured jig means angularly a desired degree relative to said mandrel axis to orient said rod member(s) helically; and securing said rotated jig means in its angular position to hold said rod member(s) in said helical orientation to provide rifled lubrication groove(s) in said rigid tube member.

4. The process according to claim 2 wherein said jig means includes a pair of ring members each having a clamping means for securing said ring member on said mandrel and a rod holding means for holding said rod member(s) in fixed position on said mandrel outer surface.

5. The process according to claim 2 wherein in step B a plurality of rod members are provided each arranged on said outer surface to extend helically of said mandrel axis and provide said rigid tube member with an inner bearing surface having rifled lubrication grooves.

6. The process according to claim 1 which includes, after step G, the additional step of finishing said peripheral surface of said rigid tube member to desired dimensions and contour prior to severing said rigid tube member into individual bearing members.

7. The process according to claim 1 wherein said hardenable liquid of step F is a thixotropic resin.

8. The process according to claim 1 wherein: in step D said layer comprises self-lubricating and shrinkable materials formed into a sleeve that is passed over said mandrel outer surface and the rod member(s) thereon and then shrunk to cause said layer to form stretched portions that bridge from each of said rod member(s) to adjacent areas of said outer surface of said mandrel to create voids along each of said rod member(s) so that the lubrication groove remaining after each rod member is removed will have a generally triangular cross-section to increase the circumferential area thereof.

9. The process according to claim 8 wherein in step F said overlayment comprises filaments helically wound under tension over said layer of self-lubricating material to be in contact with said stretched portions of self-lubricating material that lay in bridging relation between said rod member(s) and mandrel.

10. A process for producing a bearing member having a bore defined by an inner bearing surface of self-lubricating material containing lubrication grooves opening into said bore comprising the steps of:

A. providing a mandrel having an axial length, spaced apart ends and an outer surface;

B. affixing one or more rod member(s) onto said outer surface to extend generally lengthwise between said ends of said mandrel;

C. applying a parting agent to said mandrel outer surface and rod member(s);

D. applying a layer of self-lubricating material over said outer surface and rod member(s);

E. applying an overlayment on top of said layer of self-lubricating material to cause it to conform to said mandrel outer surface and rod member(s);

F. applying a hardenable liquid to bond said layer and overlayment together;

G. hardening said liquid to form a rigid tube member having a peripheral surface and axially spaced ends;

H. finishing said peripheral surface and ends to provide a finished bearing member of desired dimensions; and I. removing said mandrel and rod member(s) from said finished bearing member to expose said inner bearing surface of self-lubricating material and removing said rod member(s) to expose said lubrication groove(s).

11. The process according to claim 10 which includes the additional steps of providing a jig means that is releasably securable adjacent each of said mandrel ends for holding said rod member(s); and in step B placing said rod member(s) in said jig means and securing said jig means adjacent each of said mandrel ends to hold said rod member(s) in contact with said outer surface of said mandrel.

12. The process according to claim 11 wherein step B includes the additional steps of releasably securing said jig means that is adjacent one of said mandrel ends to hold said rod member(s) generally parallel to said axis while leaving said jig means that is adjacent the other of said mandrel ends unsecured; and rotating said unsecured jig means angularly a desired degree relative to said mandrel axis to orient said rod member(s) helically; and securing said rotated jig means in its angular position to hold said rod member(s) in said helical orientation to provide rifled lubrication groove(s) in said rigid tube member.

13. The process according to claim 11 wherein said jig means includes a pair of ring members each having a clamping means for securing said ring members on said mandrel and a rod holding means for holding said rod member(s) in fixed position on said mandrel outer surface.

14. The process according to claim 13 wherein in step B, a plurality of rod members are provided each arranged on said outer surface to extend helically of said mandrel axis to provide an inner bearing surface having rifled lubricating grooves.

15. The process according to claim 10 wherein said hardenable liquid of step F is a thixotropic resin.

16. The process according to claim 10 which includes, after step G, the additional steps of:

trimming said hardened bearing member to have a desired axial length; and finishing said peripheral surface of said rigid bearing member to desired dimensions and contour.

17. A process for producing a plurality of bearing members each of which has a bore defined by an inner bearing surface of self-lubricating material containing lubrication grooves that open into said bore comprising the steps of:

A. providing a mandrel having an axial length, spaced apart ends and an outer surface having at least one axially extending groove;

B. placing one or more rod member(s) on said outer surface to extend generally lengthwise between said ends of the mandrel and lie within said at least one axially extending groove in said mandrel with a portion of said rod member(s) protruding radially above said mandrel outer surface;

C. applying a parting agent to said mandrel outer surface and rod member(s);

D. applying a layer of self-lubricating material over said outer surface and rod members;

E. applying an overlayment on top of said layer of self-lubricating material to cause it to conform to said mandrel outer surface and said radially protruding portions of said rod member(s);

F. applying a hardenable liquid to bond said layer and overlayment together;

G. hardening said liquid to form a rigid elongated tube member having a peripheral surface and a length that will permit it to be severed into a plurality of individual bearing members;

H. removing said mandrel from said rigid tube member to expose said inner bearing surface and removing said rod member(s) to expose said lubrication groove (s); and I. severing said rigid tube transversely into a plurality of individual bearing members.

18. The process according to claim 17 wherein step A includes the additional step of providing said mandrel groove(s) in a helical orientation to provide rifled lubrication groove(s) in said rigid tube member.

19. The process according to claim 18 wherein in step B a plurality of said mandrel grooves are provided each arranged on said outer surface to extend helically of said mandrel axis and provide said rigid tube member with an inner bearing surface having rifled lubrication grooves.

20. The process according to claim 17 which includes, after step G, the additional step of finishing said peripheral surface of said rigid tube member to desired dimensions and contour prior to severing said rigid tube member into individual bearing members.

21. The process according to claim 17 wherein: in step D said layer comprises self-lubricating and shrinkable materials formed into a sleeve that is passed over said mandrel outer surface and the rod members thereon and then shrunk to cause said layer to form stretched portions that bridge from each of said rod member(s) to adjacent areas of said outer surface of said mandrel to create voids along each of said rod member(s) so that the lubrication groove remaining after each rod member is removed will have a generally triangular cross-section to increase the circumferential area thereof.

22. The process according to claim 21 wherein in step F said overlayment comprises filaments helically wound under tension over said layer of self-lubricating material to be in contact with said stretched portions of self-lubricating material that lay in bridging relation between said rod member(s) and mandrel.

23. The process according to claim 17 wherein said hardenable liquid of step F is a thixotropic resin.

* * * * *